United States Patent [19]

Kozozian et al.

[11] Patent Number: 4,706,768

[45] Date of Patent: Nov. 17, 1987

[54] ONBOARD TRUCK SCALE

[76] Inventors: Gagik Kozozian, 8321 Faust Ave., Canoga Park, Calif. 91304; Kris A. Mardian, 5619 Royer Ave., Woodland Hills, Calif. 91367

[21] Appl. No.: 835,631

[22] Filed: Mar. 3, 1986

[51] Int. Cl.⁴ .................... G01G 19/08; G01G 19/02
[52] U.S. Cl. ..................................... 177/138; 177/146
[58] Field of Search ............................. 177/136–138, 177/146

[56] References Cited

U.S. PATENT DOCUMENTS

| 1,407,078 | 2/1922 | Murray | 177/137 |
| 3,092,818 | 6/1963 | Potschka | 177/137 X |
| 4,106,579 | 8/1978 | Hayes, Sr. et al. | 177/137 |

FOREIGN PATENT DOCUMENTS 1030206 5/1958 Fed. Rep. of Germany ...... 177/137

*Primary Examiner*—George H. Miller, Jr.
*Attorney, Agent, or Firm*—Marvin E. Jacobs

[57] ABSTRACT

Apparatus for mounting between the bed and axle of a truck, or the like, to indicate the weight being carried by the truck as a function of the compression of the suspension system. A sensing member containing a load cell is mounted to the frame of the bad and a contacting member is mounted to the axle. The contacting member is slideably mounted to depress a compression spring as the frame moves towards the axle as a result of an increased load on the truck. The increasing force created thereby on the load cell causes an increase in the signal out of the load cell, which, in turn, is translated into an indication of the corresponding load or weight on the truck. The contacting member is mounted within a sealed housing and movable to a position out of contact with the load cell when not performing its weight function. As a result, the apparatus is resistant to changes in temperature, dirt, moisture, and shock.

13 Claims, 10 Drawing Figures

ONBOARD TRUCK SCALE

BACKGROUND OF THE INVENTION

The present invention relates to onboard apparatus for weighing the load on a truck or the like and, more particularly, to an onboard scale for use on trucks and the like to measure movement between a frame supported above an axle by a compressible suspension system to calculate the load weight being carried by the frame, wherein the scale comprises a sensing member adapted for mounting to the frame and including a load cell for producing at an output thereof an electrical signal proportional to a force applied to an input surface thereof; a contacting member adapted for mounting to the axle and including a movable member adapted to contact the input surface of the sensing member as the frame moves towards the axle under a load compressing the suspension system; and, proportional bias means for biasing the movable member and the input surface towards one another and for applying a proportional force against the input surface as the frame moves towards the axle so that the electrical signal is directly proportional to the weight on the frame and can be used to drive a display indicating the weight.

Onboard weighing apparatus is old and well known in the art. It was recognized at an early time that where a wagon or truck bed was suspended above an axle by a compressible suspension system employing springs, or the like, as load was added, the springs compressed and the bed moved towards the axle. In the extreme, the bed would finally come to rest on the axle. It was also recognized that a rudimentary linkage arrangement could be used to provide an indication of the amount of relative movement and, thereby the amount of weight on the wagon or truck.

With the advent of modern large truck trailers and super highways with load limitations and police enforcement thereof, the ability to provide quick and easy determination of present loading became more important and the attempts to provide a workable onboard weighing system continued. Representative examples of prior art systems for the same or similar purposes can be seen with reference to the following U.S. Pat. Nos. 14,475; 1,432,631; 2,129,343; 2,769,967; 2,779,013; 3,409,097; 3,531,766; 3,603,418; 3,646,512; 3,858,173; 3,867,990; 3,960,228; 4,106,579; 4,219,088; 4,287,958; and 4,375,839.

The prior art systems for onboard weighing have been subject to numerous problems that did not make them practical. Some were designed to be virtually built into the suspension system itself. Others incorporated numerous moving parts and linkages such that they might work well for a limited time under static conditions, but soon bound up or wore out when subjected to the dirt and frictional conditions of constant over-the-road driving. Others were of marginal accuracy due to drift in response to variations in temperature conditions that can find trucks going from subzero conditions in the north to road temperatures well over one hundred degrees in the southwest in a matter of days. The problems could be summed up as one or more of the following: not accurate; not reliable; vehicle installation not practical; breakage problems due to continuous operation, and especially due to vibration and shock, in some cases, installation requiring welding and cutting of the vehicle parts such as the axle and chasis, thus causing fatigue and possible rapid failure of the truck parts themselves.

Wherefore, it is the object of the present invention to provide an onboard scale for weighing the load on a truck or the like which is simple, reliable, easily added or removed, and resistant to dirt and temperature conditions of constant over-the-road driving.

SUMMARY

The foregoing objects have been accomplished in an onboard scale for use on trucks and the like to measure movement between a frame supported above an axle by a compressible suspension system to calculate the load weight being carried by the frame where in the scale comprises a sensing member adapted for mounting to the frame and including a load cell for producing at an output thereof an electrical signal proportional to a force applied to an input surface thereof; a contacting member adapted for mounting to the axle and including a movable member adapted to contact the input surface of the sensing member as the frame moves towards the axle under a load compressing the suspension system; and, proportional bias means for biasing the movable member and the input surface towards one another and for applying a proportional force against the input surface so that the electrical signal is directly proportional to the weight on the frame and can be used to drive a display indicating the weight.

In the preferred embodiment, the movable member is contained within a protective housing containing a sealable passageway therethrough through which a portion of the movable member passes to contact the input surface.

The preferred embodiment also includes retraction means disposed within the protective housing for selectively moving the movable member between a weighing position with the movable member in contact with the input surface and a driving position with the movable member spaced from the input surface whereby when the truck is being driven the scale is not subjected to dirt, moisture, and wearing frictional forces.

DESCRIPTION OF THE PREFERRED EMBODIMENT

Figure 1:
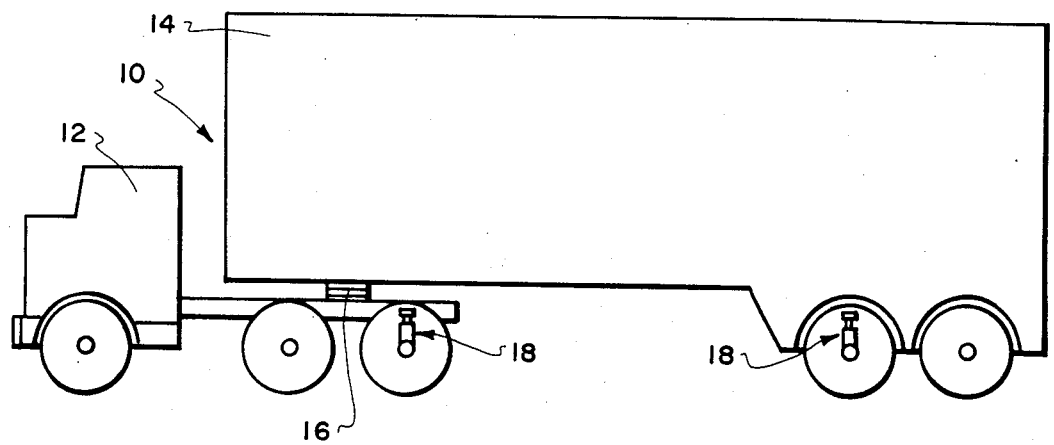
FIG. 1 is a simplified side view of a truck showing the placement of the components of the present invention.

Referring first, briefly, to FIG. 1, the use and placement of the present invention will be described. As is well known and merely an application of the basic physics involved, the total of the forces downward to the various points of suspension of a vehicle are equal to the total of the upward forces. Thus, for example, in a four-wheeled vehicle, each wheel carries approximately one-fourth of the weight. Of course, if the weight is not evenly distributed, the wheels will not carry equal loads. In a similar manner, where each wheel is connected to the vehicle by a compressible suspension system, the suspension system adjacent each wheel will be compressed an amount proportional to the portion of the total load on the truck. Thus, it is possible, and well known, to provide a scale or measuring device adjacent each wheel to measure the compression at the wheel and to then calculate the total load as the sum of the loads at the wheels.

In FIG. 1, a truck 10 is shown of the tractor/semi-trailer or so-called "semi" type comprising a tractor 12 with the driving wheels to which a semi-trailer 14 is attached by a "fifth wheel" 16. To measure the loading of the semi-trailer 14, compression responsive scales, as discussed above, can be used. In general, there are four main points of compression where the frame of the semi-trailer will move towards the axle of the truck 10 as a result of loading—the right front, the left front, the right rear, and the left rear. In FIG. 1, two scales, generally indicated as 18, are shown placed for measuring compression adjacent the left front and left rear of the semi-trailer 14, respectively. A similar pair would be disposed on the right side. Each scale 18 is operably connected between the axle of the truck 10 and the frame of the semi-trailer 14. The invention to be described hereinafter is one such scale and it is intended, under normal conditions, to be used in sets in the above-described manner.

As will be recognized by those skilled in the art, although the scale of the present invention is shown and described with relation to trucks and similar over-the-road vehicles, it could also provide advantages for use in similar circumstances such as, for example, in weighing of railroad cars, or the like. Such further uses are intended by the applicants herein to be included within the scope and the spirit of the invention and to be covered by the claims appended hereto.

Figure 2:
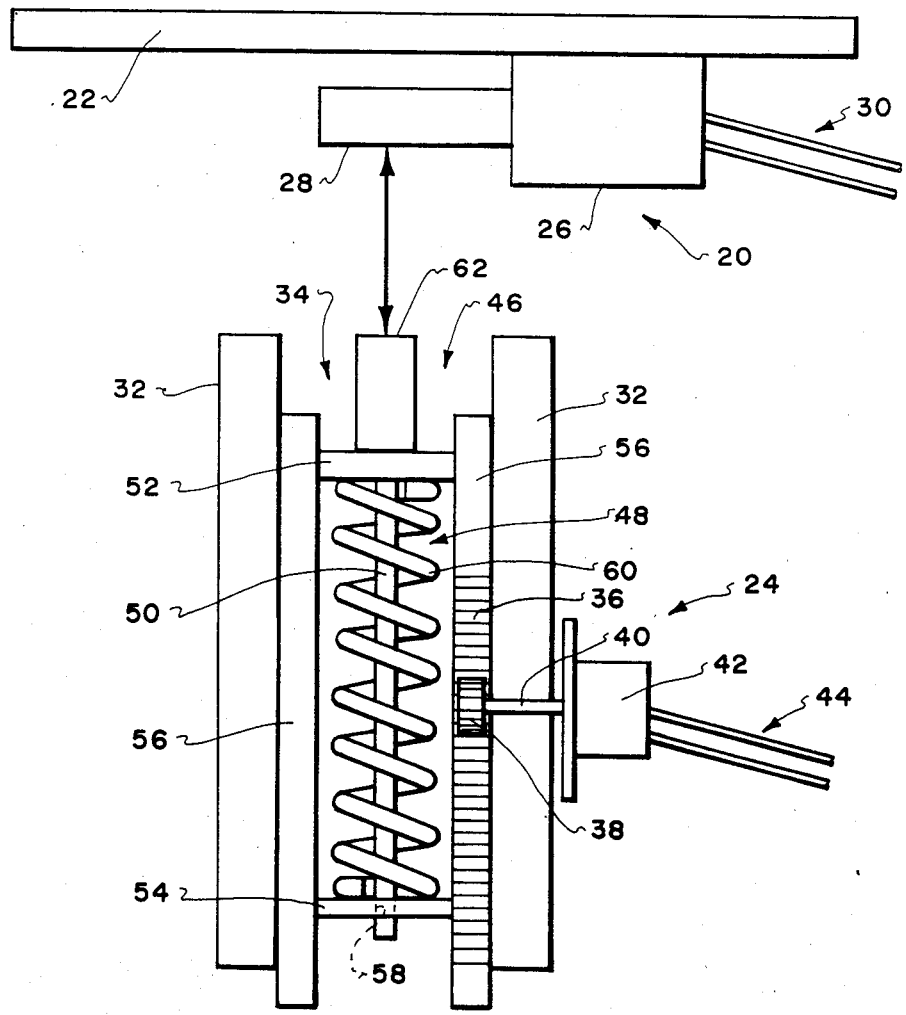
FIG. 2 is a simplified drawing of the present invention showing the basic construction and mode of operation thereof with the contacting member in its retracted or driving position.
Figure 3:
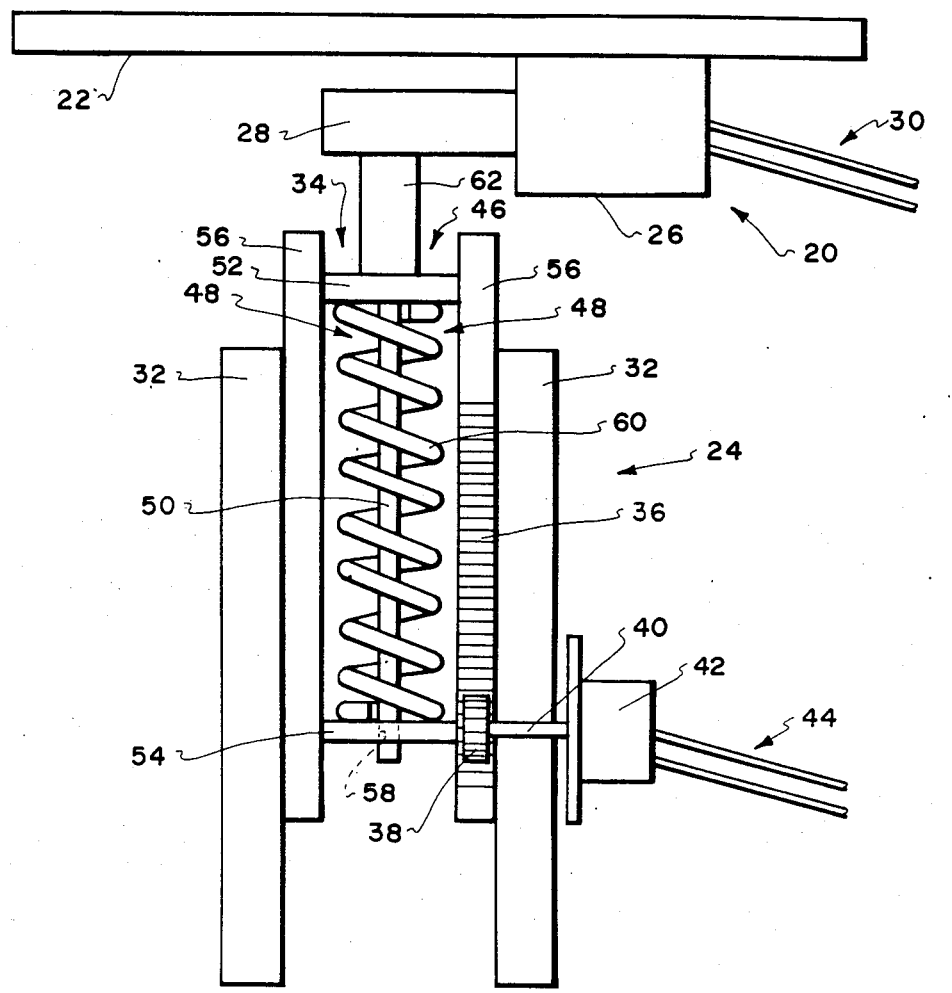
FIG. 3 is a simplified drawing of the present invention as depicted in FIG. 2 showing the basic elements thereof with the contacting member in its weighing position.
Figure 4:
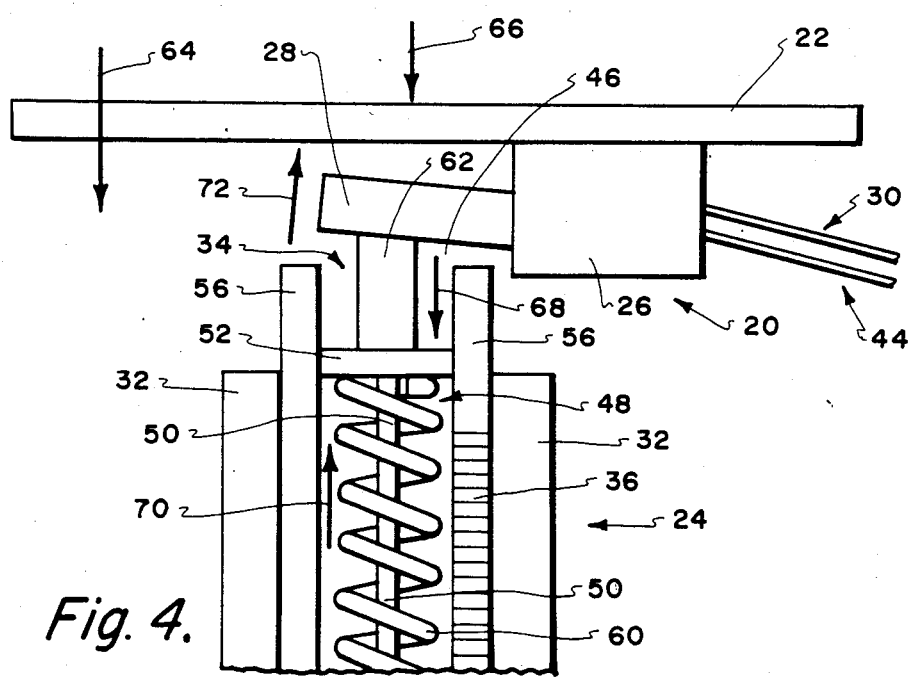
FIG. 4 is the simplified drawing of the present invention of FIGS. 2 and 3 showing the basic elements thereof with the contacting member in its weighing position and with the load cell being subjected to the force of the compressed biasing spring.

Turning first to FIGS. 2–4, the basic construction of the scale of the present invention is first shown in simplified form to more readily identify the points of novelty. The scale, generally indicated as 18 as above, comprises a sensing member 20, adapted to be mounted to the frame 22 of the semi-trailer 14, and a contacting member 24, adapted to be mounted to the axle thereof.

The sensing member 20 includes a load cell 26 of a type well known to those skilled in the art. The sensing member 20 has an input surface 28 against which a force can be directed to produce an output electrical signal on the output wires 30 which is directly proportional to the force applied. The signal on the output wires 30 can then be used in any of a number of ways well known to those skilled in the art to display a figure of interest. As will be described hereinafter, a force is created on the input surface 28 which is directly proportional to the displacement of the frame towards the axle. The output signal is directly proportional to the weight or load causing the compression and corresponding displacement. The output signal is, therefore, in direct proportion to the weight or load and it is a simple matter for anyone skilled in the art to use the output signal from the load cell 26 and known techniques to display the weight associated therewith.

The contacting member 24 includes an outer housing 32 which is attached to the axle. A sliding member 34 is disposed within the housing 32 for vertical movement between a raised "weighing position" and lowered "driving position". As shown in FIG. 2, the sliding member 34 is in its lowered position. In FIG. 3, it is in its raised position. For simplicity and as a representative manner of operation only, the sliding member 34 is shown as incorporating a rack gear 36 driven by a pinion gear 38 on shaft 40 of motor 42. The motor 42 can be driven in either direction by the application of the proper electrical power to wires 44. Motor 42, therefore, can be conveniently used by the driver to raise and lower the sliding member 34 electrically from the cab of the tractor 12.

Mounted to the sliding member 34 is a moving member 46 comprising a T-shaped slider 48 comprising a longitudinal member 50 and a cross-member 52. A brace 54 is rigidly disposed between the two parallel side members 56 of the sliding member 34. Brace 54 has a bore 58 therethrough through which the longitudinal member 50 is disposed for longitudinal sliding motion therethrough. A helical compression spring 60 is disposed about the longitudinal member 50 between the cross-member 52 and the brace 54. A contacting arm 62 is mounted to the top of the cross-member 52 and extends longitudinally upward therefrom in alignment with the input surface 28 of the sensing member 20. As will be seen in the two actual embodiments to be described hereinafter, the spring 60 can be incorporated within either the sensing member 20 or the contacting member 24 to effect the purposes and novelty of the present invention.

Turning now with particular reference to FIGS. 3 and 4, with the sliding member 34 in its raised or weighing position of FIG. 3, the components are positioned such that the contacting arm 62 just contacts the input surface 28 when there is a "no load" condition, i.e., there is no compression of the suspension system due to a load in the semi-trailer 14 (as opposed to the normal compression due to the weight of the unloaded semi-trailer 14 itself). As depicted in FIG. 4, as the frame 22 moves downward, as indicated by the arrow 64, as a result of a load, as indicated by the arrow 66, the input surface 28 of the load cell 26 pushes the contacting arm 62 downward, as indicated by the arrow 68, thus compressing the biasing spring 60. This causes an upward force, as indicated by the arrow 70, by the spring 60, through contacting arm 62 against the input surface 28 which tends to move in the direction of arrow 72 creating a signal on wires 30. The more the spring 60 is compressed, the greater the force on the input surface 28. Thus, the output signal on the wires 30 is caused by a proportional compression force from the spring 60 and not as a result of actual movement involving the load cell 26 itself. As will be further described with relationship to the two embodiments hereinafter, the contacting member 24 is generally sealed with the equivalent of the contacting arm 62 passing through a sealed opening in a protective housing whereby there are no moving parts exposed to the elements or abrasive materials to cause operational problems and wear.

It should be further realized that the linear motion of the T-shaped slider 48 and the linear compression spring 60 could be replaced with, for example, a member moving in an arcuate movement and biased by a rotating helical spring, or the like, to provide the required proportional force on the input surface 28 as a result of displacement.

Figure 5:
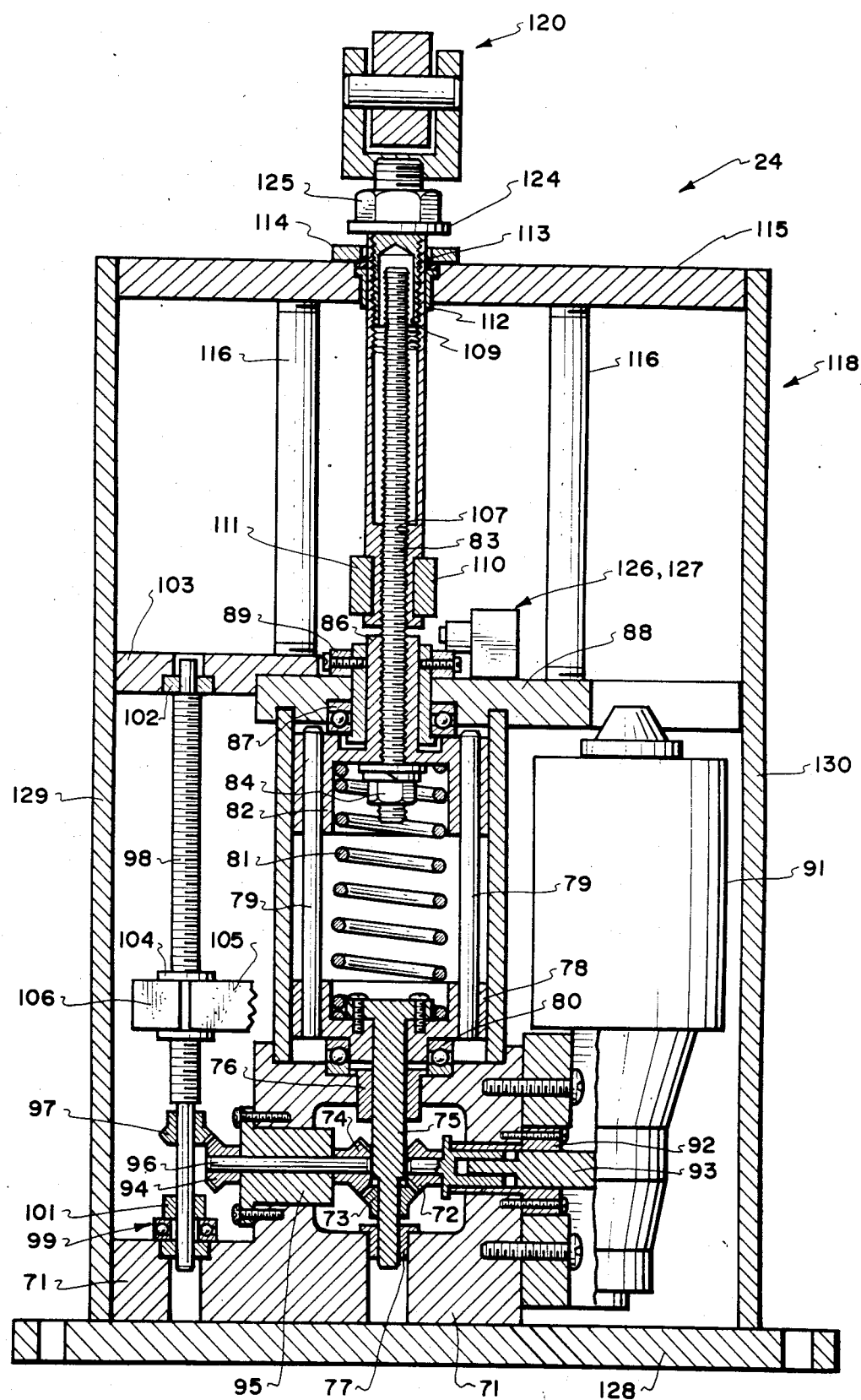
FIG. 5 is a cutaway elevation in the plane of the centerline of the contacting portion of the present invention in a first tested embodiment.
Figure 6:
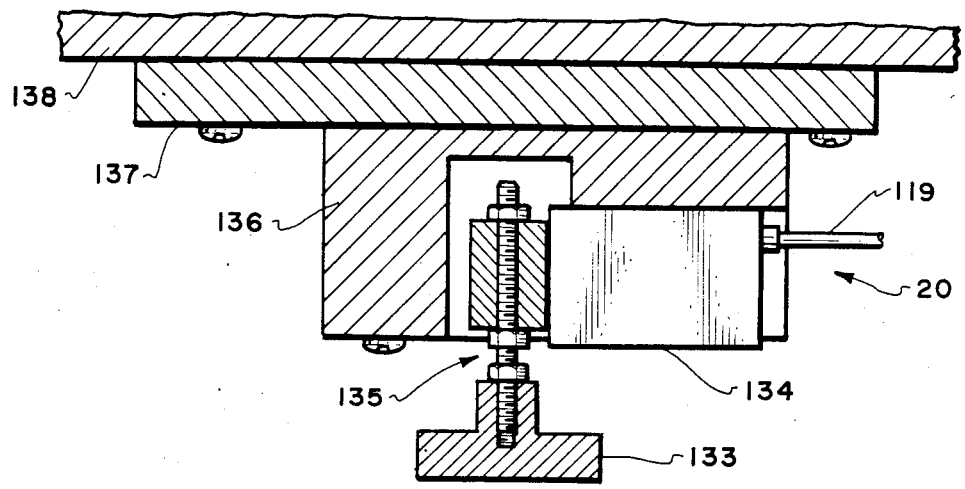
FIG. 6 is a cutaway elevation in the plane of the centerline of the sensing portion of the present invention in the embodiment of FIG. 5.
Figure 7:
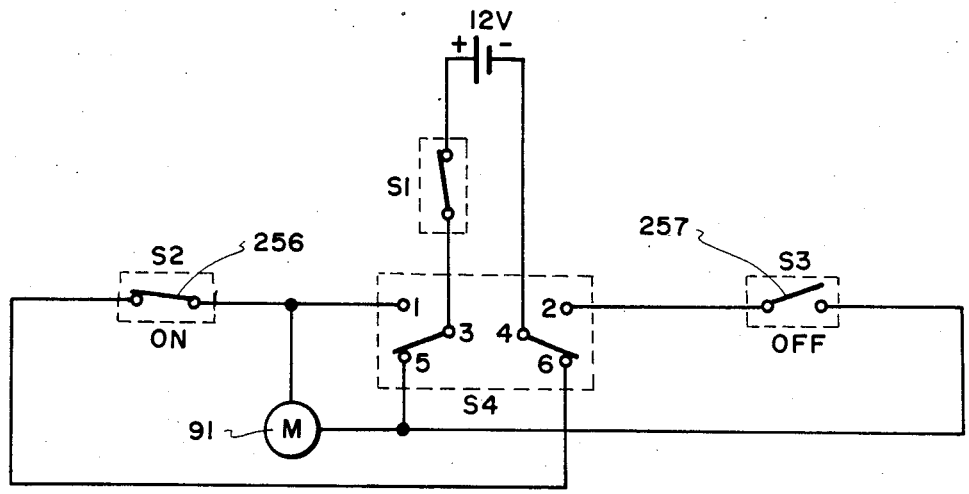
FIG. 7 is a circuit diagram of the control circuit of the present invention showing the action of raising the contacting portion to its weighing position.
Figure 8:
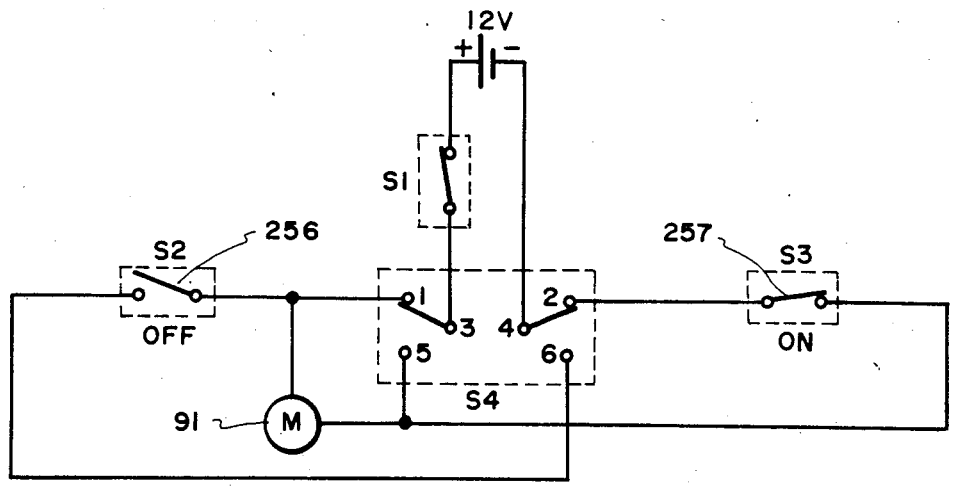
FIG. 8 is the circuit diagram of the control circuit of the present invention from FIG. 7 showing the action of lowering the contacting portion to its driving position.
Figure 9:
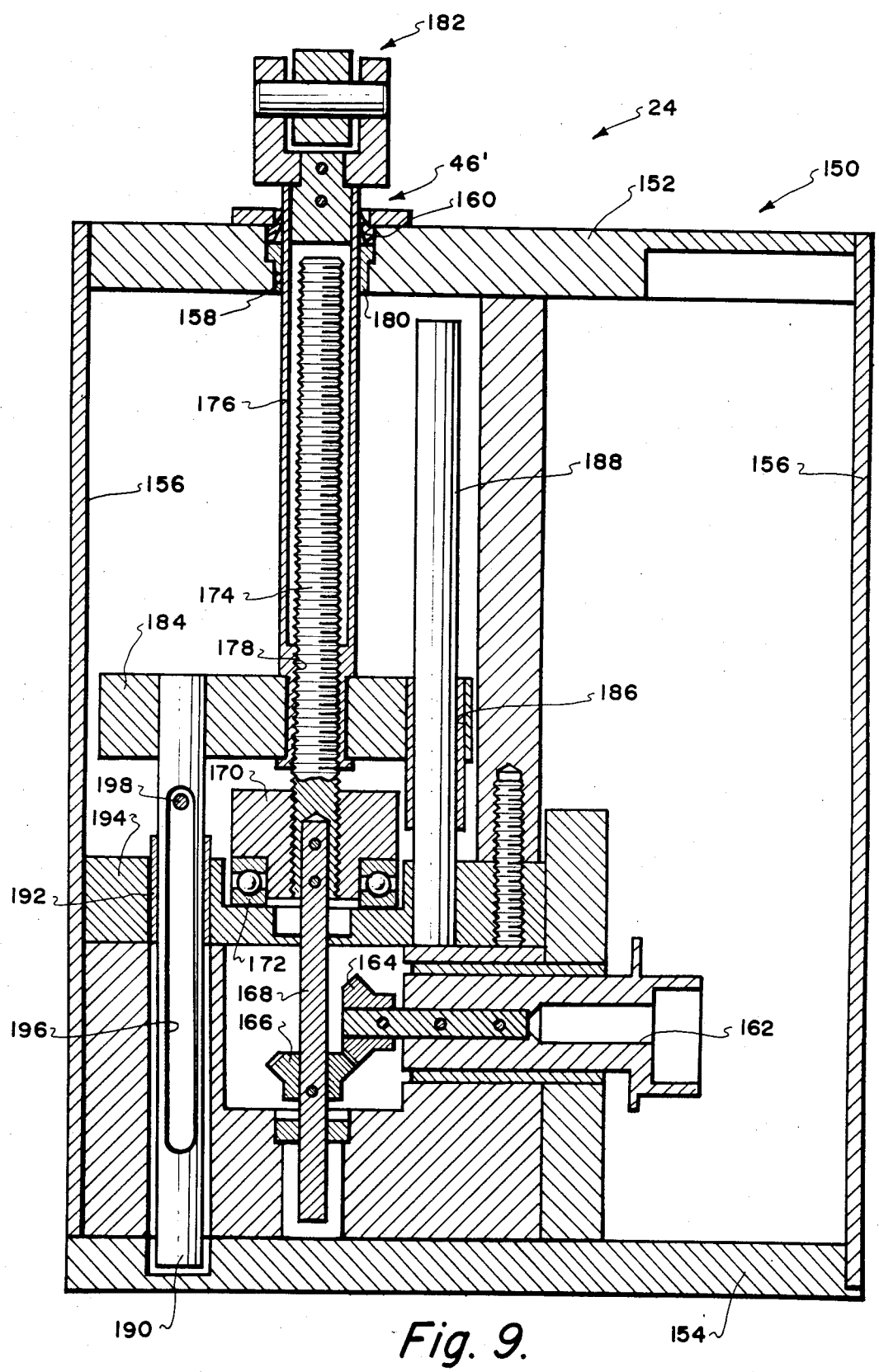
FIG. 9 is a cutaway elevation in the plane of the centerline of the contacting portion of the present invention in a second and preferred embodiment.
Figure 10:
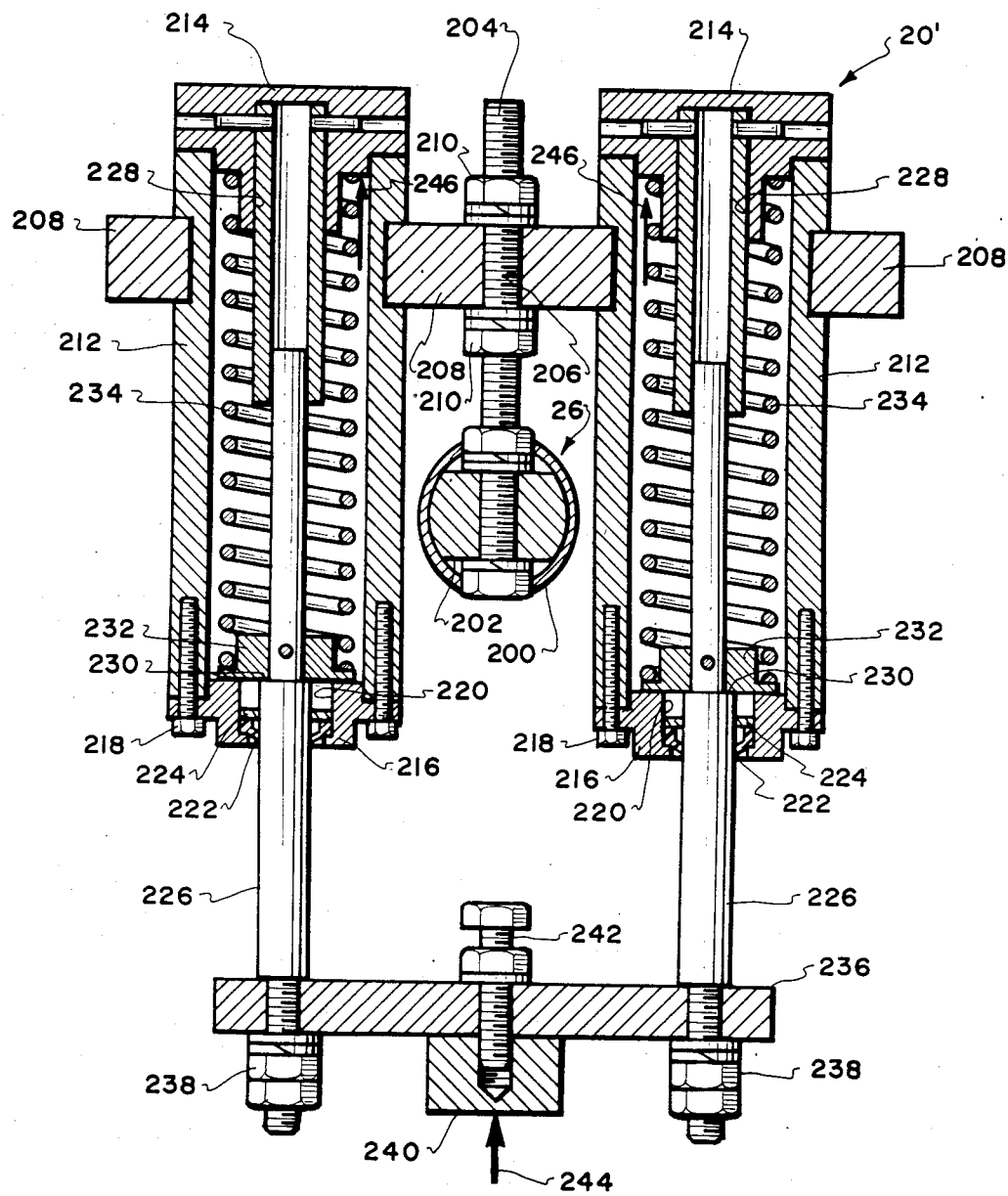
FIG. 10 is a cutaway elevation in the plane of the centerline of the sensing portion of the present invention in its second and preferred embodiment.

Preferred and alternate embodiments as built and tested by the applicants herein will now be shown and described in detail with respect to FIGS. 5-10. FIGS. 5 and 9 are directed to the contacting member while FIGS. 6 and 10 are directed to the sensing member. FIGS. 7 and 8, which will be addressed later, are directed to the electrical circuit employed to move the contacting member between its raised and lowered positions.

Turning first to the embodiment of FIGS. 5 and 6, transmission casing 71 includes three 1:1 ratio bevel gears 72, 73, and 74. The central bevel gear 73 is mounted on a T-shaped vertical shaft 75 supported by brass bearings 76 and 77. Shaft 75 is fixed with two bolts to the spring cup 78. Four rods 79 are fixed in equal 90° distances in the spring cup 78. The bottom of the spring cup 78 is sealed on thrust bearing 80. Stainless steel compression spring 81 is located in the center of the spring cup 78.

Spring cap 82, which has four holes matching the steel rods 79, is seated on the compression spring 81 in a precise manner such that during compression, spring 81 slides up and down easily on rods 79 while the spring centerline maintains an exact vertical position to the centerline of shaft 75 at all times. Threaded rod 83 is mounted in the center of spring cap 82 through a threaded hole inside the spring cap and is fastened with nut 84. Bushing 86 and thrust bearing 87 are located inside cover plate 88. Bushing 86 is tightly fixed to cover plate 88 by ring 89. Sufficient tolerance is allowed for easy movement of thrust bearing 87. Cover plate 88 with inserted components 86, 87, and 89, is concentrically positioned with respect to the threaded rod 83 and the center hole of bearing 86 at a point where thrust bearing 87 is seated over spring cap 82.

Electric motor 91 (12 volts D.C. for automotive operation) is mounted with four bolts to casing 71 and is connected to bevel gear 72 through bushing 92 and coupling shafts 93. Bevel gear 74 is connected to bevel gear 94 through bushings 95 and shaft 96. Bevel gear 94, in turn, is connected to bevel gear 97. The direction of rotation of bevel gear 97, therefore, is the same as bevel gear 73.

The lower part of threaded shaft 98 is mounted on casing 71 through ball bearings 99 and collar 101. The upper part of threaded rod 98 is supported by bushing 102 which is located inside plate 103, which is fixed with bolts to plate 88. Threaded rods 98 and 83 have the same pitch. Bushing 104, which has a threaded hole longitudinally therethrough, is mounted on threaded rod 98. The U-shaped piece 105 is fixed to bushing 104 by two bolts through plate 106. On the two sides of the U-shaped piece 105 adjacent the rod 98, two rods (not shown) are each fixed and fastened with one bolt. Both rods have a groove inside them between upper and lower points designated as "A" and "B", respectively.

Hollow rod 109 is mounted on threaded rod 83. The bottom part of hollow rod 109 has a threaded portion 107 with the same pitch of thread as rod 83. Rod 109 is fixed with two half-plates 110 and 111 by means of two bolts. The connection of these plates produces two holes, one at each end, the diameters of which are slightly bigger than the diameter of each of the grooved rods, thus allowing the grooved rods to slide easily inside the two holes and prevent rotation of the hollow rod 109 about threaded rod 83.

Bushing 112, sealing ring 113, and ring 114 are placed in the center of plate 115 which is the top of a protective housing around the mechanism and generally indicated as 118. The upper part of rod 109 is slid into the cover plate 115 through bushing 112 and sealing ring 113 and is tightly fastened with four rods 116 to plate 88. Roller assembly 120 is threaded onto the hollow threaded rod 109 and fastened with washer 124 and hex nut 125.

It should be noted that the above-described mechanism in combination with the fixed position of plates 110 and 111 onto rod 109 as well as the grooved rods functioning as stopping agents against any possible turning of plates 110 and 111, creates the desired raising and lowering action provided by the rack and pinion gears in the simplified example of FIG. 2. All the above operate in such a way that the turning of the rod 83 in a clockwise or counter-clockwise direction causes rod 109 and roller assembly 120 to move in combination in up and down vertical movement, respectively.

Two single-pole on/off switches 126 and 127 (to be discussed in detail along with the associated electrical circuitry hereinafter) are located on plate 88 such that the end of each switch activating lever is inside the groove of one of the grooved rods. Sufficient clearance is allowed around each switch for easy vertical movement of the grooved rods. During vertical movement of the grooved rods, the rods come into contact with switches 126 and 127 only at upper and lower shoulders corresponding to the "A" and "B" positions, respectively.

Plate 128 is fastened to casing 71 and is used as a base plate to mount the complete contacting member to a truck axle with U-bolts. Plate 128 is also part of the protective housing 118. Plates 129 and 130 are fixed with bolts to plates 88, 103, 115, and 128 to insure the rigidity of the completed assembly and to provide additional protions of the protective enclosure 118 therefor.

Turning now to FIG. 6, plate 133 is mounted on a load cell transducer 134, of the type well known to those skilled in the are art, by means of threaded stud and nuts 135. Load cell 134 with assembled plate 133 is fixed to casing 136 with two bolts. Casing 136 including load cell 134 and plate 133 are mounted to plate 137 with two bolts. Pressure on plate 133 will, therefore, cause a proportional electrical output signal on line 119 out of load cell 134.

The sensing member comprising plate 137 with the load cell 134 is mounted to truck bed beam 138 with bolts such that the center of threaded stud 135 and the center of plate 133 (the input surface of the sensing member) maintain an exact vertical position to the centerline of rod 109 at a distance of approximately two to five inches from the top of roller assembly 120.

The operation of the scale of the present invention will now be described. Additional reference should be made at this point to the circuit diagrams of FIGS. 7 and 8.

Preparing the Scale Before Loading the Truck

During loading of the truck, roller 120 is positioned in the lowered or "driving position" within a few inches of the plate 133. The truck driver puts switch S1 (a single-pole on/off switch) in the on position. Switch S2 (which is switch 256 in FIG. 7) is already set to the on position and switch S3 (switch 257 in FIG. 7) is set to the off position.

Upon putting switch S4 (double-pole/double-throw) in the first position as seen in FIG. 7, motor M (motor 91 of FIG. 5) turns clockwise which (in the manner described above) causes rod 109 to be pushed upward. In a matter of moments, roller 120 is raised to a position in contact with plate 133 at which time switches S2 and S3 are changed to their off and on positions, respectively, by the shoulders of the "A". The motor M is thereby stopped and the scale is ready to register the load of the truck. The scale is now in its "weighing position".

Registering the Load of the Truck

During loading of the truck, the truck bed 138 will begin moving downward toward the axle of the truck, due to the compression of the suspension system. As a result, plate 133, being connected to the truck bed, will also start moving downward. Movement of the plate 133 pushes roller 120 and, thereby, push rod 109 downward. The downward movement of rod 109, in turn, compresses spring 81 causing axial pressure on rod 109. This pressure, which is directly proportional to the vertical movement of rod 109, is transferred to roller 120 and, as a result, to plate 133 as well, and, finally, through the threaded stud 135 to the load cell 134. The load cell, acting as a transducer, transmits signals directly related to the pressure thereon from its output through the wires to an electronic load indicator (not shown) installed inside the driver's cabin, which is used to display the indication of the pressure or weight. Due to the proportional relationship between the pressure of spring 81 and the load of the truck, the signals transmitted from the load cell 134 to the load indicator represent the load or weight of the truck. The type of indicator employed (digital or analog) is a matter of choice and the manner of driving such an indicator with the signal from the load cell 134 is well known to those skilled in the art. Neither form part of the present invention, per se, and, therefore, they are not described in further detail herein.

After the Loading Operation

After completing the loading of the truck, the driver changes switch S4 to the position shown in FIG. 8, which causes the Motor M to turn counter-clockwise and, thereby, lower rod 109 downward. This causes roller 120 to move away from plate 133 toward the driving position. When the driving position, with roller 120 fully loaded, has been reached, switches S2 and S3 are changed to their on and off positions, respectively, by the shoulders at the "B" position of rods 107 and 109. Motor M once again stops and the driver puts switch S1 in the off position. The truck is then set to move the load over the highway with the scale of the present invention in its housed and protected position. Should the load need to be checked in transit, with the truck stopped, the driver need only put the scale in its weighing position in the manner described above. The scale can then be returned to its driving position before proceeding with the trip.

While the first embodiment as described above worked well for its intended purpose when built and tested by the applicants, it was found that there was a certain degree of difficulty in construction and assembly thereof which would render the embodiment more costly to manufacture on a commercial basis. To solve this potential problem, the applicants devised the preferred second embodiment of FIGS. 9 and 10 which will now be described.

As can be seen immediately with reference to FIGS. 9 and 10, in this embodiment, the compression spring biasing function has been moved from incorporation within the contacting member to incorporation within the sensing member. As a result of this relocation, however, the assembly of the components of the present invention is greatly simplified.

Turning first to FIG. 9, the contacting member is shown therein and generally indicated as 24'. Contacting member 24' comprises a protective housing 150 having a top 152, bottom 154, sides 156, and front and back covers (not shown) which protect the mechanism from dirt and moisture as well as providing a means for mounting the mechanism of the contacting member 24' to the axle of the truck. The top 152 has a bore 158 therethrough through which the moving member 46' can move between the raised and lowered weighing and moving positions previously described with respect t the first embodiment. A flexible seal 160 is provided in the bore 158 to prevent the entry of dirt and moisture into the protective housing 150 as the moving member 46' moves up and down in use.

As with the previous embodiment, an electric motor (not shown) is connected in the manner of FIGS. 7 and 8 to drive horizontal shaft 162 bidirectionally. Shaft 162 has bevel gear 164 on the end thereof which, in turn, drives bevel gear 166 on the end of vertical shaft 168. Vertical shaft 168 drives the rotary member 170 which is mounted on the thrust bearing 172. Threaded shaft 174 extends verically upward from the rotary member 170 to be rotated bidirectionally in combination therewith. A cylindrical sliding member 176 is disposed concentrically about the threaded shaft 174 with an engaging portion at 178 engaged with the threads of the shaft 174; thus, as the shaft 174 is rotated bidirectionally, the sliding member 176 is moved up and down. The sliding member 176 passes out of the protective housing 150 through a bushing 180 disposed in the bore 158 to prevent wear and the previously described seal 160. As with the previous embodiment, the top end of the sliding member 176 is provided with a roller, generally indicated as 182, through which contact with the sensing member (to be described shortly) is effected.

A cross member 184 is attached to the bottom of the sliding member 176 to move up and down in combination therewith. The cross member carries a sleeve 186 that moves up and down cylindrical shaft 188 which is disposed parallel to the threaded shaft 174. As a result, rotary movement of the sliding member 176 about the threaded shaft 174 is prevented and proper alignment of the roller 182 maintained. The cross member 184 also carries a shaft 190 which is also disposed parallel to the threaded shaft 174. Shaft 190 slides through a cylindrical bearing 192 which is carried by plate 194. Plate 194 is supported horizontally by the housing 150 and also carries the thrust bearing 172. As with sleeve 186 and shaft 188, shaft 190 and bearing 192 guide the sliding member 176 in its vertical movement and prevent rotation about the threaded shaft 174. Additionally, however, shaft 190 has a longitudinal slot 196 therein which operates the activating levers 198 of the electrical switches (the operation of which was previously described) which are disposed therein in the same manner as the shoulders "A" and "B" of the first embodiment.

Turning now to FIG. 10, the sensing member of this embodiment is shown and generally indicated as 20'. The load cell is generally indicated at 26 as in the previous embodiment. The load cell 26 is mounted by member 200 to the frame of the truck. Pressure against surface 202 causes the electrical output from the load cell 26 proportional to the force applied as previously described. Bolt 204 is mounted through bore 206 so that, as can be seen, an upward force on the bolt 204 will cause the heat of bolt 204 to create a signal-producing force or pressure against the surface 202 of the load cell 26.

The bolt 204 is mounted to horizontal cross piece 208 by nuts 210. Cross piece 208 also carries a pair of vertically disposed hollow cylinders 212. The cylinders 212 are each closed at the top end with an end cap 214. The bottom ends of the cylinders 212 have removable caps 216 attached thereto with screws such as those indicated as 218. Each cap has a centrally located bore 220 there through with a seal 222 and a bearing 224 such as those previously described to prevent the entry of dirt and moisture and to prevent wear. A shaft 226 is mounted through each bore 220 and guided in up and down movement by a cylindrical sleeve 228 mounted to the end cap 214. Each shaft 226 has a shoulder 230 against which is disposed a retaining member 232. A compression spring 234 is disposed concentrically about each of the shafts 226 between the end cap 214 and the retaining member 232.

The bottom end of each of the shafts 226 is attached to a common cross member 236 by nuts 238 threaded thereon. A bearing pad 240 is connected to the bottom of the cross member 236 by bolt 242 at a position intermediate the two shafts 226. The bearing pad 240 forms the input surface of the sensing member 20' in this embodiment.

Having thus described the construction of this embodiment, it can be realized that the assembly thereof is much easier than that of the first embodiment. The operation thereof will now be described.

As the frame moves down, as in the previous embodiment, the input surface of the sensing member 20' (i.e. the pad 240) moves towards the roller 182 of the contacting member 24'. At the point of contact, an upward force against the pad 240, as indicated by the arrow 244 is transmitted by the cross member 236 into an upward force on the shafts 226 which start to move upward into the cylinders 212. In so doing, the retaining members 232 are moved upward by the shoulders 230 which, in turn, begins to compress the springs 234. As the springs 234 (which tend to bias the movable member portion of the contacting member and the input surface of the sensing member towards one another) are compressed and they, in turn, create an upward force, as indicated by the arrows 246, against their respective end caps 214. This latter force (which is proportional to the compression of the spring and, therefore, to the weight on the truck moving the frame towards the axle as in the previous embodiment) is transmitted via the cylinders 212 to the horizontal cross piece 208 and from there to the bolt 204 and then to the input surface 202 of the load cell 26 to produce the desired proportional electrical output signal.

Thus it can be seen that the present invention has truly met its stated objective by providing an onboard scale for trucks and the like which is easy to mount and remove, simple, accurate, reliable, and resistive to lock up and wear due to exposure to adverse conditions encountered in over-the-road hauling.

Wherefore, having thus described our invention, we claim:

1. An on-board scale for use on trucks and the like to measure movement between a frame supported above an axle by a compressible suspension system to calculate the load weight being carried by the frame, said scale comprising:
   (a) a sensing member including first means for mounting said sensing member along an axis to the frame and including a load cell for producing at an output thereof a range of electrical signals proportional to a range of load weight force applied to an input surface thereof;
   (b) a contacting member including second means for mounting said contacting member to the axle, said contacting member including a movable member adapted for movement along said axis into a first weighing position in contact with said input surface of said load cell at no load weight on the truck whereby as the load weight on the truck is increased the frame moves toward the axle compressing the suspension system and applying a force by said contacting member on the input surface directly proportional to the load and into a second driving position in which the contacting member is not in contact with the input surface; and
   (c) proportional bias means including a compression spring provided in either of said first or second mounting means for absorbing a portion of the load force applied by the contacting member to the input surface whereby a force proportional to the load force is applied against said input surface as the truck is loaded to cause the frame to move towards the axle whereby said electrical signal is directly proportional to the load of the truck.

2. The onboard scale of claim 1 wherein:
   (a) said proportional means is disposed in the mounting means for the contacting member; and,
   (b) said movable member and said proportional bias means are contained in a protective housing containing a sealable passageway therethrough through which a portion of said movable member passes to contact said input surface.

3. The onboard scale of claim 1 wherein:
   (a) said proportional means is disposed in the mounting means for the sensing member; and,
   (b) said movable member is contained in a protective housing containing a sealable passageway therethrough through which a portion of said movable member passes to contact said input surface.

4. The onboard scale of claim 1 wherein:
   (a) said movable member is contained in a protective housing containing a sealable passageway therethrough through which a portion of said movable member passes to contact said input surface; and additionally comprising, (b) retraction means disposed within said protective housing for selectively moving said movable member between a weighing position with said movable member in contact with said input surface and a driving position with said movable member spaced from said input surface whereby when the truck is being driven, the scale is not subjected to frictional forces.

5. An on-board scale according to claim 1 in which the load cell is a transducer.

6. An on-board scale for use on trucks and the like to measure movement between a frame supported above an axle by a compressible suspension system to calculate the load weight being carried by the frame, said scale comprising:

(a) a sensing member including first means for mounting the sensing member to the frame along an axis and including a load cell for producing at an output thereof a range of electrical signals proportional to a load weight force applied to an input surface thereof;

(b) a protective housing including second means for mounting the housing to the axle along said axis and containing a sealable passageway therethrough through which a portion of a movable member can pass to contact said input surface;

(c) a contacting member disposed within the protective housing, said contacting member including a movable member adapted to pass through said passageway and into a first weighing position in contact with said input surface of said load cell at no load weight on the truck whereby as the load weight of the truck is increased, the frame moves toward the axle compressing the suspension system and applying a force on the input surface from the movable member directly proportional to the load weight and into a second position out of contact with said input surface;

(d) proportional means including a compression spring provided in either of said first or second mounting means for absorbing a portion of the load force applied by the contacting member to the input surface whereby a force porportional to the load force is applied against said input surface as the truck is loaded to cause the frame to move towards the axle whereby said electrical signal is directly proportional to the load of the truck.

7. The onboard scale of claim 6 and additionally comprising:

retraction means disposed within said protective housing for selectively moving said movable member between a weighing position with said movable member in contact with said input surface and a driving position with said movable member spaced from said input surface whereby when the truck is being driven the scale is not subjected to frictional forces.

8. The onboard scale of claim 7 wherein said retraction means comprises:

(a) a slider disposed within said protective housing carrying said movable member, said slider being adapted to slideably move between raised and lowered positions wherein when in said raised position said movable member is in said weighing position and when in said lowered position said movable member is in said driving position; and, (b) electrically operated power means operably connected to said slider for moving said slider between said raised and lowered positions.

9. The onboard scale of claim 8 wherein:
said bias means is incorporated into said slider to move up and down in combination therewith.

10. The onboard scale of claim 8 wherein:
said bias means is disposed in combination with said sensing member.

11. An onboard scale for use on trucks and the like to measure movement between a frame supported above an axle by a compressible suspension system to calculate the load weight being carried by the frame, said scale comprising:

(a) a sensing member including first means for mounting said sensing member along an axis to the frame and including a load cell for producing at an output thereof a range of electrical signals proportional to a range of load weight force applied to an input surface thereof;

(b) a protective housing including second means for mounting the housing to the to the axle along said axis and containing a sealable passageway therethrough which a portion of a movable member can pass to contact said input surface.

(c) a contacting member disposed within said protective housing, said contacting member including a movable member adapted to pass through said passageway and into a first weighing position in contact with said input surface of said load cell at no load weight on the truck whereby as the load weight of the truck is increased, the frame moves towards the axle under a load compressing the suspension system and applying a force on the input surface from the movable member directly proportional to the load weight and into a second position out of contact with said input surface;

(d) proportional bias means incorporated into said sensing means for biasing said input surface towards said contacting member and for applying a proportional force against said load cell as the frame moves towards the axle whereby said electrical signal is directly proportional to the weight on the frame; and, (e) retraction means disposed within said protective housing for selectively moving said movable member between a weighing position with said movable member in contact with said input surface and a driving position with said movable member spaced from said input surface whereby when the truck is being driven the scale is not subjected to wearing frictional forces.

12. The onboard scale of claim 11 wherein said retraction means comprises:

(a) a slider disposed within said protective housing carrying said movable member, said slider being adapted to slideably move between raised and lowered positions wherein when in said raised position said movable member is in said weighing position and when in said lowered position said movable member is in said driving position; and, (b) electrically operated power means operably connected to said slider for moving said slider between said raised and lowered positions.

13. An onboard scale for use on trucks and the like to measure movement between a frame supported above an axle by a compressible suspension system to calculate the load weight being carried by the frame, said scale comprising:
- (a) a sensing member adapted for mounting to the frame and including a load cell for producing at an output thereof an electrical signal proportional to a force applied to an input surface thereof;
- (b) a protective housing adapted for mounting to the axle and containing a sealable passageway therethrough through which a portion of a movable member can pass to contact said input surface;
- (c) a contacting member disposed within said protective housing, said contacting member including a movable member adapted to pass through said passageway and contact said input surface of said sensing member as the frame moves towards the axle under a load compressing the suspension system;
- (d) proportional bias means incorporated into said sensing means for biasing said input surface towards said contacting member and for applying a proportional force against said load cell as the frame moves towards the axle whereby said electrical signal is directly proportional to the weight on the frame; and,
- (e) retraction means disposed within said protective housing for selectively moving said movable member between a weighing position with said movable member in contact with said input surface and a driving position with said movable member spaced from said input surface, said retraction means comprising a slider carrying said movable member and adapted to slideably move between raised and lowered positions wherein when in said raised position and movable member is in said weighing position and when in said lowered position said movable member is in said driving position; and,
- (f) electrically operated power means operably connected to said slider for moving said slider between said raised and lowered positions whereby when the truck is being driven the scale is not subjected to wearing frictional forces.

* * * * *